United States Patent
Ku (10) Patent No.: US 7,240,082 B2
(45) Date of Patent: Jul. 3, 2007

(54) METHOD FOR PROCESSING EFFICIENCY IN A PIPELINE ARCHITECTURE

(75) Inventor: Shan-Chyun Ku, Taipei (TW)

(73) Assignee: Faraday Technology Corp., Hsin-Chu (TW)

( * ) Notice: Subject to any disclaimer, the term of this patent is extended or adjusted under 35 U.S.C. 154(b) by 688 days.

(21) Appl. No.: 10/604,267

(22) Filed: Jul. 7, 2003

(65) Prior Publication Data

US 2005/0010623 A1    Jan. 13, 2005

(51) Int. Cl.
*G06F 7/38* (2006.01)
*G06F 9/30* (2006.01)

(52) U.S. Cl. ................................ 708/233; 712/219
(58) Field of Classification Search .............. 708/521, 708/233, 200, 490; 712/213–219
See application file for complete search history.

(56) References Cited

U.S. PATENT DOCUMENTS

| | | | | |
|---|---|---|---|---|
| 4,935,849 A * | 6/1990 | Miranker | .................... | 708/441 |
| 5,119,324 A * | 6/1992 | Ahsan | ........................ | 708/520 |
| 6,952,764 B2 * | 10/2005 | Sager et al. | ................ | 712/218 |
| 6,965,906 B1 * | 11/2005 | Dhablania | ................... | 708/204 |
| 7,007,059 B1 * | 2/2006 | Mohammed et al. | ....... | 708/233 |
| 2004/0111455 A1 * | 6/2004 | Skull | ......................... | 708/233 |

* cited by examiner

*Primary Examiner*—Meng-Al T. An
*Assistant Examiner*—Chat C. Do
(74) *Attorney, Agent, or Firm*—Winston Hsu (57) ABSTRACT

A method for improved processing efficiency of pipeline architecture with a processor. The processor has a first functional unit; a second functional unit; and a control unit electrically connected to the first and the second functional units for generating a plurality of control signals to control the first and the second functional units. The method includes following steps: (a) executing a first calculation task with the first functional unit or the second functional unit; (b) determining an executing time period of a second calculation task with the control unit according to the functional unit executing the first calculation task, an executing time period of the first calculation task, and whether the second calculation task depends upon a result of the first calculation task; and (c) executing the second calculation task with the first functional unit according to the executing time period of the second calculation task determined in step (b).

5 Claims, 8 Drawing Sheets

| Is a first calculation task executed a first functional unit or not? | Is a first calculation task of a first functional unit executed in E2 level or not? | Does a second calculation task have data dependence with a first calculation task or not? | Is a second calculation task of a first functional unit executed in E2 level or not? |
|---|---|---|---|
| 0 | x | 0 | 0 |
| 0 | x | 1 | 1 |
| 1 | 0 | 0 | 0 |
| 1 | 0 | 1 | 1 |
| 1 | 1 | 0 | 1 |
| 1 | 1 | 1 | 1 |

Fig. 8

METHOD FOR PROCESSING EFFICIENCY IN A PIPELINE ARCHITECTURE

BACKGROUND OF INVENTION

1. Field of the Invention

The present invention provides a method for improving processing efficiency of pipeline architecture, and more particularity a method for determining an executing time period of a current calculation task according to a previous calculation task.

2. Description of the Prior Art

Pipeline architecture is one of the most widely used calculation architectures for microprocessor systems. Pipeline architecture utilizes a time pulse to control a register file that can store results from executing a series of calculation tasks with a plurality of functional units, and the results are identically transmitted to a functional unit to execute a next calculation task. An advantage of pipeline architecture is the capable of simultaneous control. Because the functional units usually execute various calculation tasks with different complexities, executing time periods of the various calculation tasks differ in length. Therefore, under a condition of utilizing pipeline architecture, a very complicated and long calculation task easily results in a wrong calculation task because data cannot synchronize at some point in time, especially under a condition of complicated data dependency between the functional units. Thus, utilizing pipeline architecture cannot suitably divide a series of complicated calculation tasks and help to simplify the complexities of simultaneous control.

Figure 1:
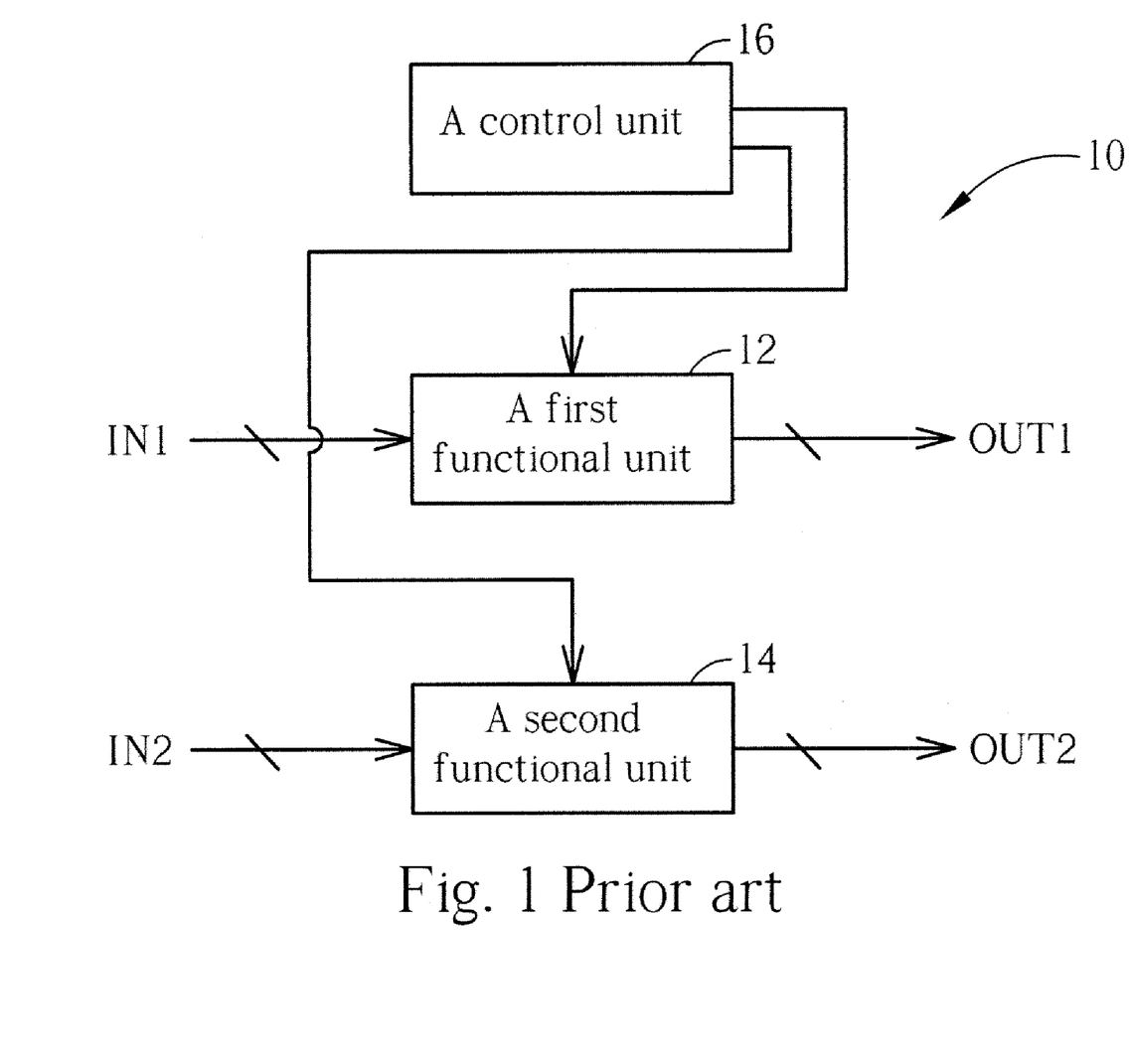
FIG. 1 is a functional diagram of a processor of pipeline architecture.

Please refer to FIG. 1. FIG. 1 is a functional diagram of a processor 10 of pipeline architecture. The processor 10 comprises a first functional unit 12, a second functional unit 14, and a control unit 16. The first functional unit 12 is for executing a calculation task. The second functional unit 14 is for executing another calculation task. The control unit 16 is electrically connected to the first and the second functional units for generating a plurality of control signals to control the first and the second functional units 12, 14. The control unit 16 will depend upon desired calculation tasks to orderly control the first and second functional units 12, 14 to execute calculation tasks. Simultaneously, depending upon the desired calculation tasks, the control unit 16 controls input data to the first and second functional units 12, 14 (IN1 and IN2 in FIG. 1) and exports results from executing the calculation tasks of the first and second functional units 12, 14 (OUT1 and OUT2 in FIG. 1).

Next, the first functional unit 12 is assumed as an Arithmetic and Logic Unit (ALU), and the second functional unit 14 is a Multiplication and Accumulation Unit (MAC). Because the MAU executes a more complicated calculation task than the ALU, the second functional unit 14 needs a longer executing time period than the first functional unit 12. For example, an executing time period of the first functional unit 12 is one instruction cycle and an executing time period of the second functional unit 14 is two instruction cycles.

Figure 2:
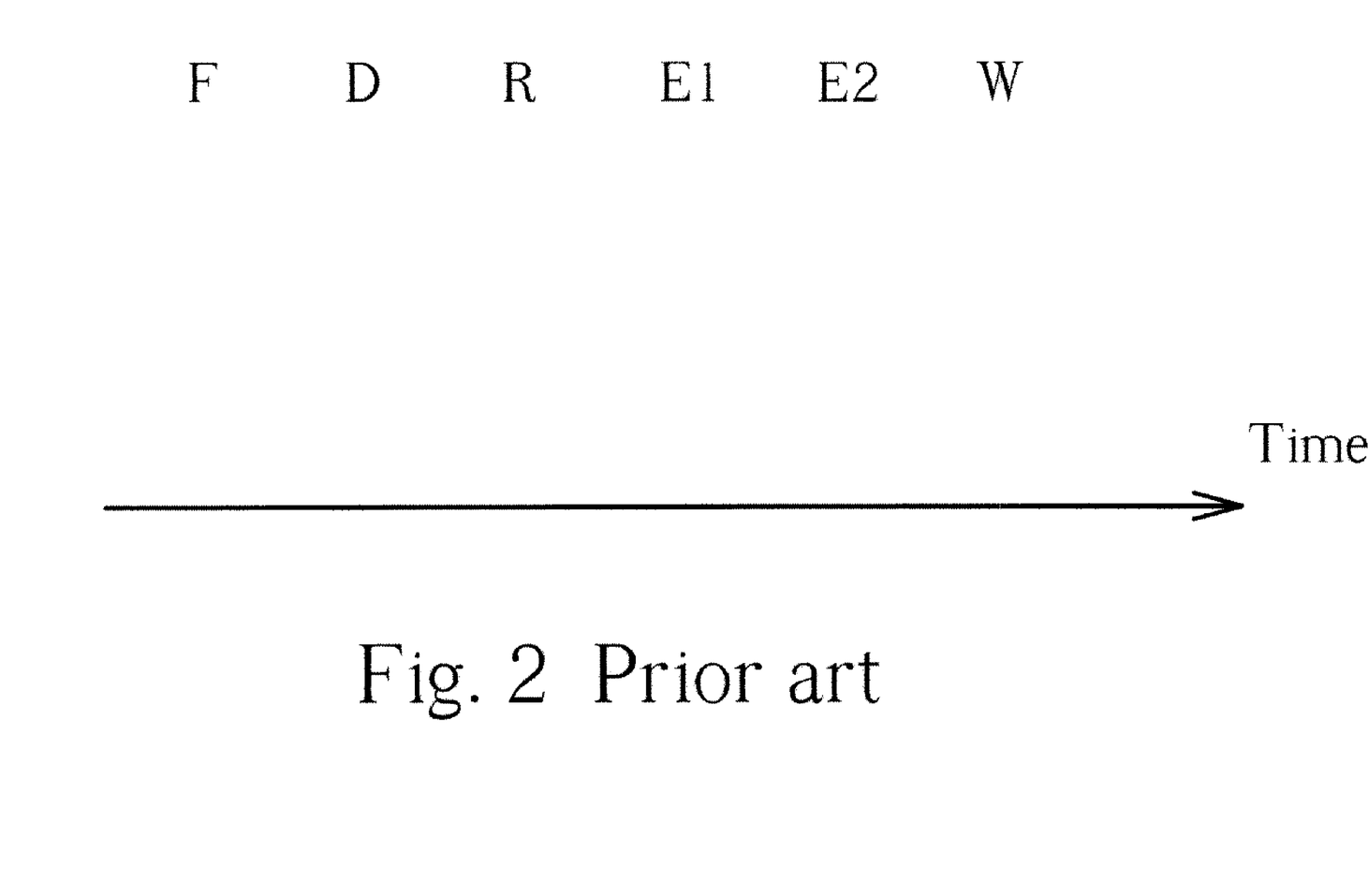
FIG. 2 is a timing prospective view of a processor executing a calculation task.

Please refer to FIG. 2. FIG. 2 is a timing prospective view of the processor 10 executing a calculation task. FIG. 2 shows when the processor 10 utilizes the control unit 16 to generate a control signal to control a functional unit for executing a calculation task, according to timing sequence levels such as fetch instruction (level F), decode (level D), read register (level R), execution (level E1 and E2), and write back (level W). Each level as mentioned above takes one instruction cycle. Please note, parts of an executing calculation task are the parts of utilizing calculation capacities of functional units where the parts of the executing calculation tasks are only levels E1 and E2 that are in coordination with the longest executing time period of the functional unit (as the second functional unit 14) of the processor 10. If the processor 10 comprises the functional units needing longer executing time periods, parts of executing calculation tasks can increase an amount of levels depending upon requirement.

Figure 3:
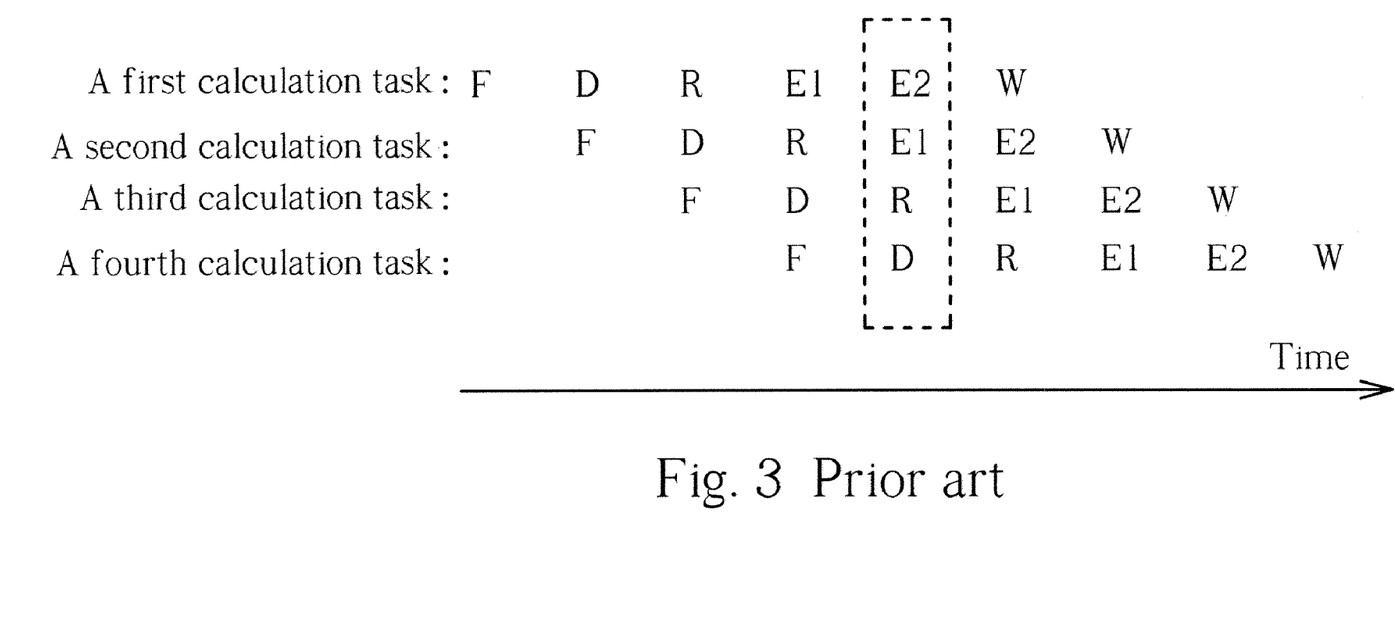
FIG. 3 is a timing prospective view of a processor executing a series of calculation tasks.

Please refer to FIG. 3. FIG. 3 is a timing prospective view of the processor 10 executing a series of calculation tasks. Please note, FIG. 3 shows a timing of calculation task that does not consider data dependency between various calculation tasks and as an ideal status. In FIG. 3, according to desired calculation tasks, the control unit 16 utilizes control signals to orderly control the first and second functional units 12, 14 to execute a series of calculation tasks (as a first, a second, a third, and a fourth calculation tasks in FIG. 3) wherein each adjacent calculation task differs one instruction cycle. Under such arrangement, during a specific time period of calculation processing (as the part within dotted line in FIG. 3), different calculation tasks lie in different levels. Therefore, the different calculation tasks can be executed simultaneously because of utilizing different system sources. Please note, as mentioned above, an executing time period of the first functional unit 12 is only one instruction cycle. Therefore, the prior art defines either the level E1 or level E2 to execute a real calculation task and maintains the other one in an unused status. Next, please refer to FIG. 4 and FIG. 5 to illustrate a condition of data dependency between different calculation tasks and a timing of the processor 10 when executing a series of calculation tasks.

Figure 4:
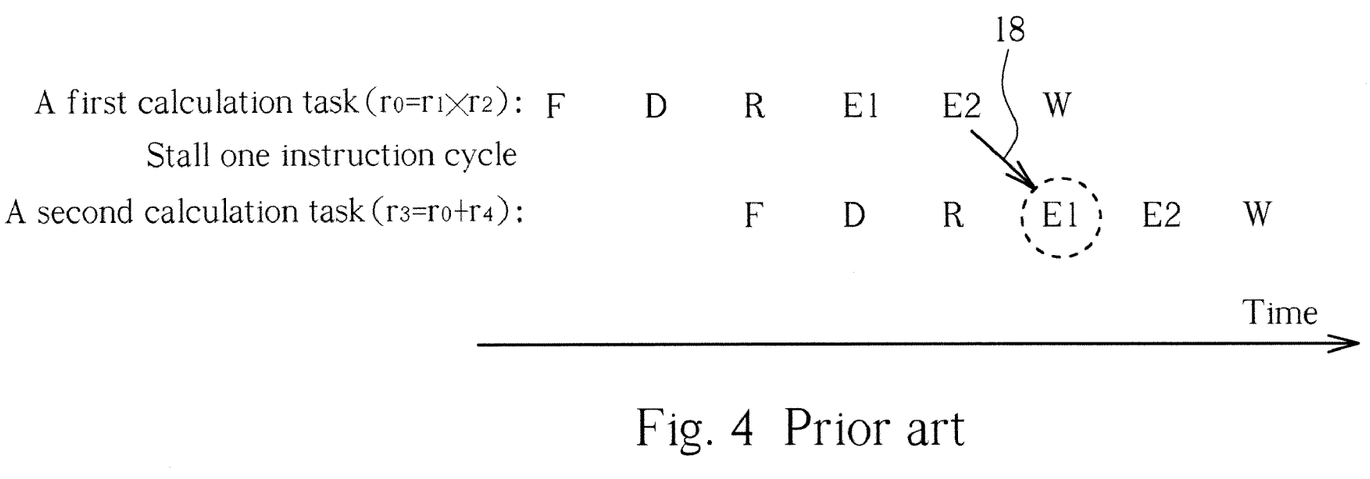
FIG. 4 is a timing prospective view of a processor executing a calculation task of r3=(r1*r2)+r4.

FIG. 4 is a timing prospective view of the processor 10 executing a calculation task of r3=(r1*r2)+r4. In FIG. 4, r0=r1*r2 and the first functional unit 12 will execute a real calculation task in the level E1 (as shown within the dotted line in FIG. 4) are simultaneously assumed. In FIG. 4, in the first calculation task, the processor 10 will utilize the second functional unit 14 (MAU) to execute r0=r1*r2. After a result of the first calculation task comes out, the result will be transmitted to the first functional unit 12 (ALU) to execute the second calculation task (r3=r0+r4). However, two instruction cycles are needed for an execution of the second functional unit 14 that includes the level E1 and level E2 to complete the calculation task, and the second calculation task has data dependency on the result from the first calculation task (shown as an arrow 18 in FIG. 4). Thus, the second calculation task cannot be executed right after one instruction cycle of the first calculation task as shown in FIG. 3. As shown in FIG. 4, after two instruction cycles of the first calculation task, the second calculation task is then executed (the second calculation task stalls one instruction cycle), otherwise the result of the second calculation task will be wrong because of an incorrect data input. In the present example, the first functional unit 12 executes a real calculation task in the level E2 is initially assumed. The timing in FIG. 3 will not influence a correction of the result from the calculation task because of data dependency. Therefore, as mentioned above a stall of the calculation task will not occur.

Figure 5:
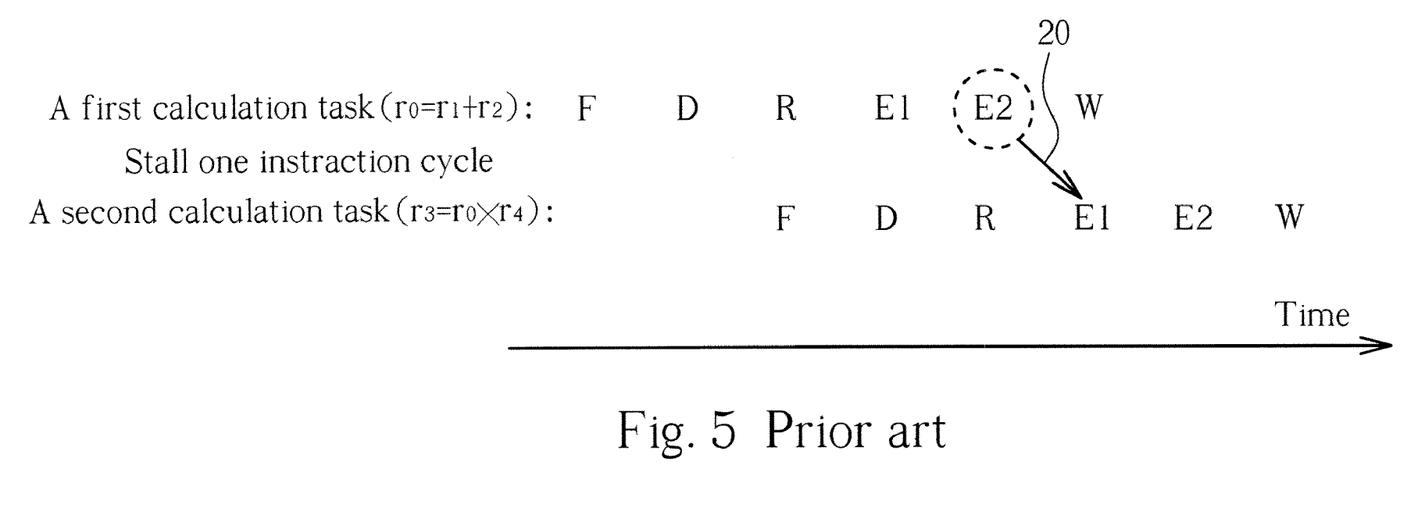
FIG. 5 is a timing perspective view of a processor executing a calculation task of r3=(r1+r2)*r4.

Another example is shown in FIG. 5, a timing perspective view of the processor 10 executing a calculation task of r3=(r1+r2)*r4. In FIG. 5, r0=r1+r2 and the first functional unit 12 executing a real calculation task in the level E2 are simultaneously assumed (as the parts within the dotted line in FIG. 5). In FIG. 5, during the first calculation task, the processor 10 utilizes the first functional unit 12 (ALU) to execute a calculation of r0=r1+r2. After a result from the first calculation task comes out, the result is then transmitted to the second functional unit 14 (MAU) to execute the second calculation task. However, because the first functional unit 12 starts a real calculation in the level E2, the second calculation task having data dependency on the result from the first calculation task (as an arrow 20 in FIG. 5) cannot be executed right after one instruction cycle of the first calculation task as shown in FIG. 3. But, as shown in FIG. 5, two instruction cycles after the first calculation task, the second calculation task starts to execute (the second calculation task stalls one instruction cycle), otherwise, the result of the second calculation task will be wrong because of an incorrect data input. Moreover, in the present example, the first functional unit 12 executing a real calculation task in the level E1 is initially assumed. The timing in FIG. 3 will not influence a correction of the result from the calculation task because of data dependency. Therefore, as mentioned above, a stall of the calculation task will not occur.

Integrated in FIG. 4 and FIG. 5 and as mentioned above, in the prior art no matter whether the first functional unit 12 executes a real calculation in either the level E1 or the level E2, one stalled instruction cycle of the calculation task will possibly occur. If a calculation of r5=abs ((r1+r2)*r3) is considered where abs is absolute value and is executed by ALU. No matter whether the first functional unit 12 executes a real calculation task in either the level E1 or level E2, one stalled instruction cycle of the calculation task will possibly occur. In more complicated calculations, a condition of a stall will occur frequently.

In the prior art, a stall will cause a huge damage to a processing efficiency of pipeline architecture. When a stall occurs, a timing interval between two adjacent calculation tasks of writing back data is prolonged (as a cycle of time pulse controlling a register file). Under a fixed cycle of time pulse, the stall causes an increasing of the time period of the calculation task over that of the cycle of time pulse and pipeline architecture will delay one cycle of time pulse for the whole calculation resulting in a decline of processing efficiency. Therefore, a condition of Very-Long Instruction Word (VLIW) becomes obvious because calculation tasks under the VLIW condition are executed as a unit of a plurality cycle of time pulse. If a calculation task is influenced because of the stall, the whole execution package of calculation tasks will be delayed resulting in more damage to processing efficiency of pipeline architecture.

SUMMARY OF INVENTION

It is therefore a primary objective of the claimed invention to provide a method for determining an executing time period of a current calculation task according to a previous calculation task to solve the above-mentioned problems.

According to the claimed invention, the method improves processing efficiency of pipeline architecture with a processor. The processor has a first functional unit, a second functional unit, and a control unit. The first functional unit executes a calculation task. The second functional unit executes another calculation task. The control unit is electrically connected to the first and the second functional units and generates a plurality of control signals to control the first and the second functional units. The method comprises: (a) executing a first calculation task with the first functional unit or the second functional unit; (b) determining an executing time period of a second calculation task with the control unit according to the functional unit executing the first calculation task, an executing time period of the first calculation task, and whether the second calculation task depends upon a result of the first calculation task; and (c) executing the second calculation task with the first functional unit according to the executing time period of the second calculation task determined in step (b).

The method of the claimed invention will calculate a best suitable executing time period of the second calculation task according to conditions such as the type of functional unit used in a previous calculation task, an executing time period of the previous calculation task, and whether a current calculation task needs a result from the previous calculation. Then, determining the lowest possibility of a stall improves the processing efficiency of pipeline architecture.

DETAILED DESCRIPTION

Figure 6:
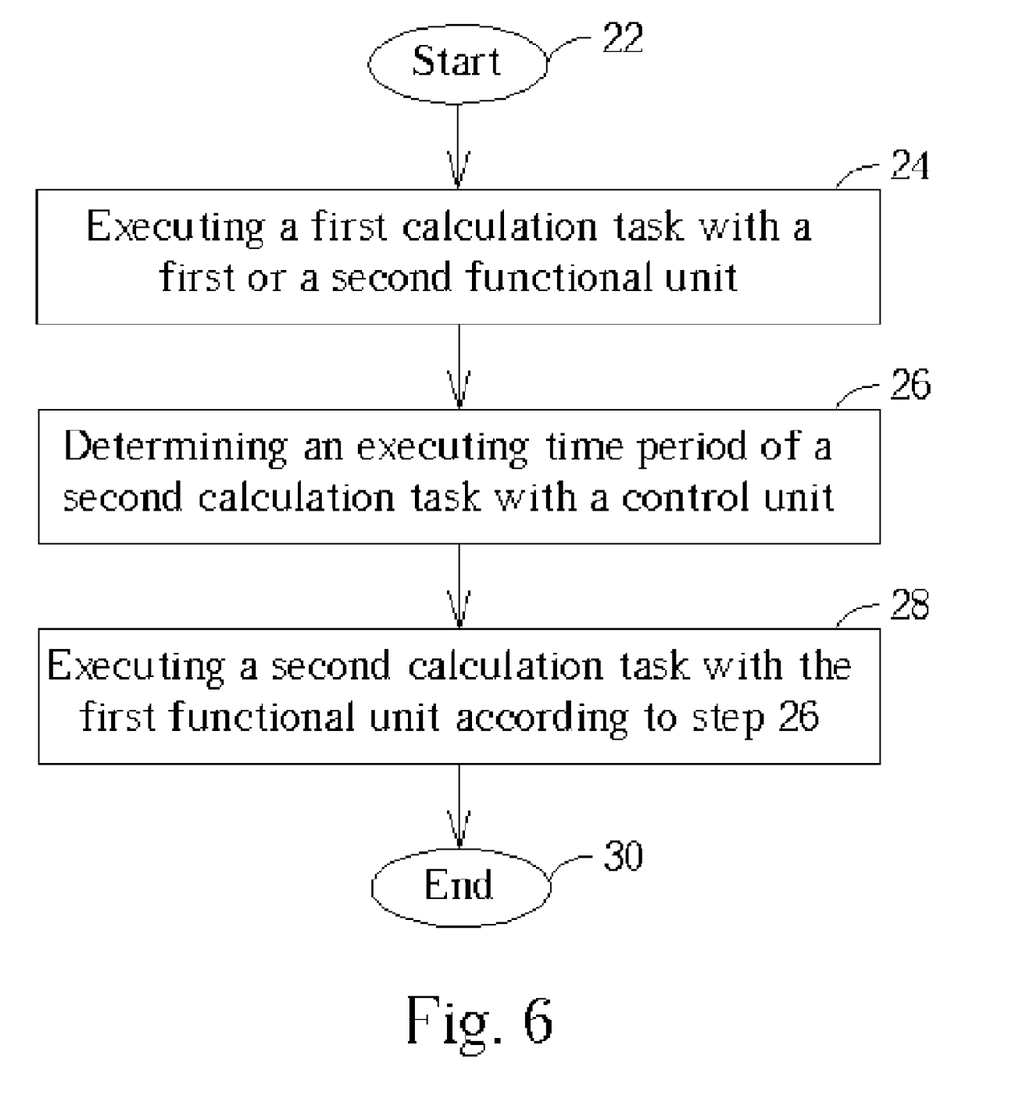
FIG. 6 is a diagram of a method according to the present invention for improved processing efficiency of pipeline architecture with the processor shown in FIG. 1.

Please refer to FIG. 6. FIG. 6 is a diagram of a method according to the present invention for improved processing efficiency of pipeline architecture with the processor 10 shown in FIG. 1. The method comprises:

Step 22: Start;

Step 24: Executing a first calculation task with the first functional unit 12 or the second functional unit 14;

Step 26: Determining an executing time period of a second calculation task with the control unit 16 according to the functional unit executing the first calculation task, an executing time period of the first calculation task, and whether the second calculation task depends upon a result of the first calculation task;

Step 28: Executing the second calculation task with the first functional unit 12 according to the executing time period of the second calculation task determined in step 26; and Step 30: End.

Different from the method of executing calculation tasks in levels (also called as static pipeline stage control) of the prior art, the present invention executing a current calculation task (as the second execution task) will in advance judge that the previous calculation task (as the first calculation task) is executed by which functional unit, the previous calculation task is really executed by which level, and whether the current calculation task has any data dependency on the previous calculation task. Then, according to a result from judging the above-mentioned conditions, the most suitable level to execute the real calculation task is calculated for the current calculation task. In contrast to the prior art, the present method is a dynamic pipeline stage control.

Figure 7:
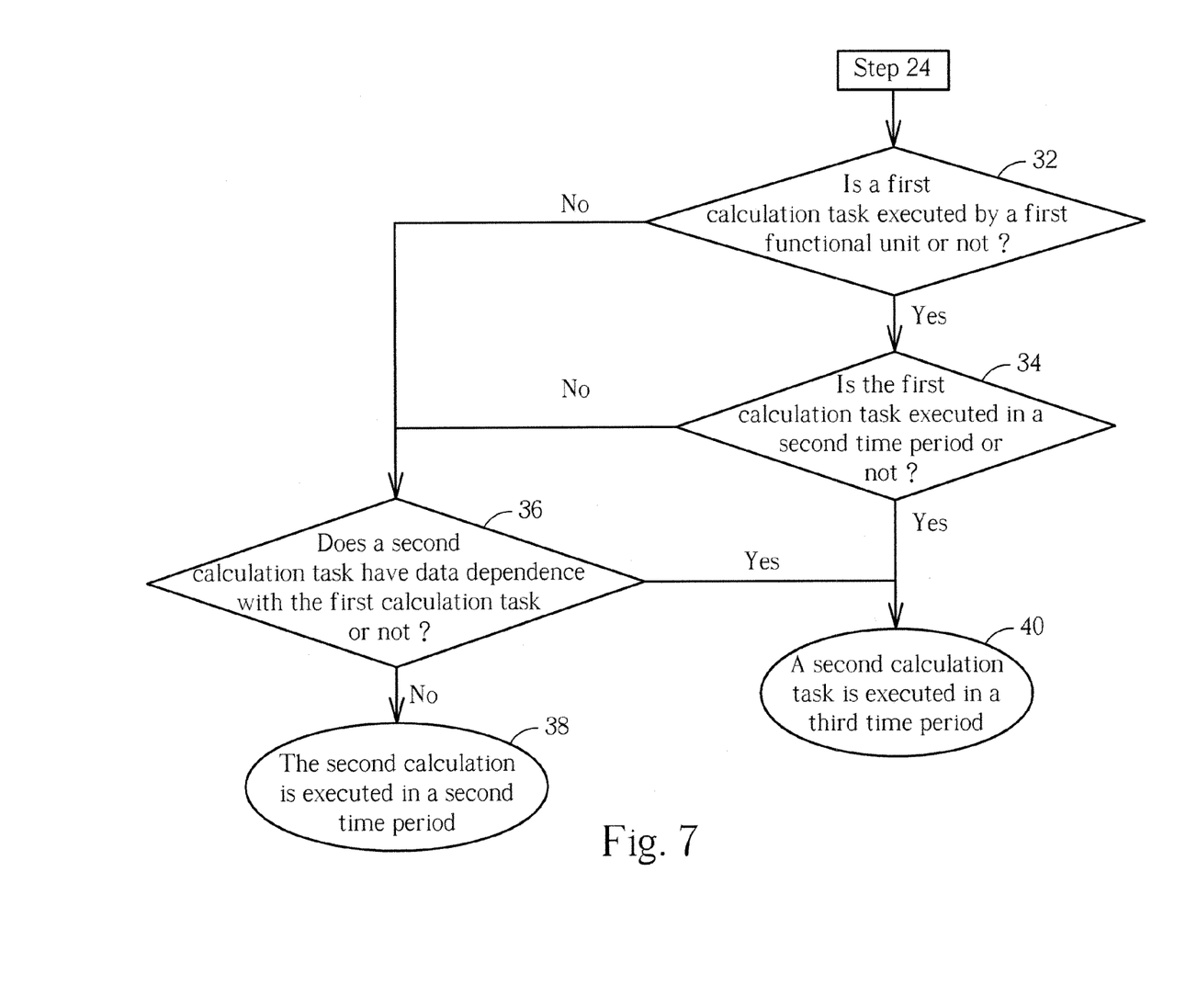
FIG. 7 is a diagram of a method according to the best embodiment of the present invention for improved processing efficiency of pipeline architecture with the processor shown in FIG. 1.

Next, please refer to FIG. 7 to describe detailed execution steps of one of the best embodiments of the present invention. FIG. 7 is a diagram of a method for improved processing efficiency of pipeline architecture with the processor 10 as shown in FIG. 1. In the present embodiment, the first functional unit 12 is ALU and the second functional unit 14 is a MAU are assumed. Because the MAU executes a more complicated calculation task, the second function unit 14 needs an executing time period longer than an executing time period of functional unit 12. The executing time period of the first functional unit 12 is one instruction cycle, and the executing time period of the second functional unit 14 is two instruction cycles. Please note, the control unit 16 of the present embodiment generates a plurality of control signals to orderly control the first and the second functional units 12, 14 as in a first time period (as the first calculation unit in the level E1) and a second time period (as the first calculation unit in the level E2) executing the first calculation task, and in a second time period (as the second calculation unit in the level E1) and a third time period (as the second calculation unit in the level E2) executing the second calculation task. The lengths of the first, second, and third time periods are all equal to one instruction cycle, and the first, second, and third time periods are non-overlapping with one another, and the second time period is later than the first time period and the third time period is later than the second time period.

As shown in FIG. 7, the method comprises (please note, the following steps occur after the previous step 24): Step 32: Utilizing the control unit 16 to check whether the first calculation task is executed by the first functional unit or not. If yes, Step 34 is executed. If no (the first calculation task is executed by the second functional unit 14), Step 36 is executed.

Step 34: Utilizing the control unit 16 to check whether the first calculation task is executed in the second time period or not. If yes, Step 40 is executed. If no, Step 36 is executed.

Step 36: Utilizing the control unit 16 to check whether the second calculation task has data dependency on a result from the first calculation task or not. If yes, Step 40 is executed. If no, Step 38 is executed.

Step 38: Utilizing the control unit 16 to control the first functional unit 12 to execute the second calculation task in the second time period.

Step 40: Utilizing the control unit 16 to control the first functional unit 12 to execute the second calculation task in the third time period.

Consider a condition of the second functional unit 14 executing the first calculation task in the first and second time periods and the first functional unit 12 executing the second calculation task. If the second calculation task does not need the result from the first calculation task, the first functional unit 12 is controlled by the control unit 16 to execute the second calculation task in the second time period. If the second calculation task needs the result from the first calculation task, the first functional unit 12 is controlled by the control unit 16 to execute the second calculation task in the third time period.

Now consider a condition where the first functional unit 12 executes the first calculation task in the first time period and also executes the second calculation task. If the second calculation task does not need the result from the first calculation task, the first functional unit 12 is controlled by the control unit 16 to execute the second calculation task in the second time period. If the second calculation task needs the result from the first calculation task, the first functional unit 12 is controlled by the control unit 16 to execute the second calculation task in the third time period.

Figure 8:
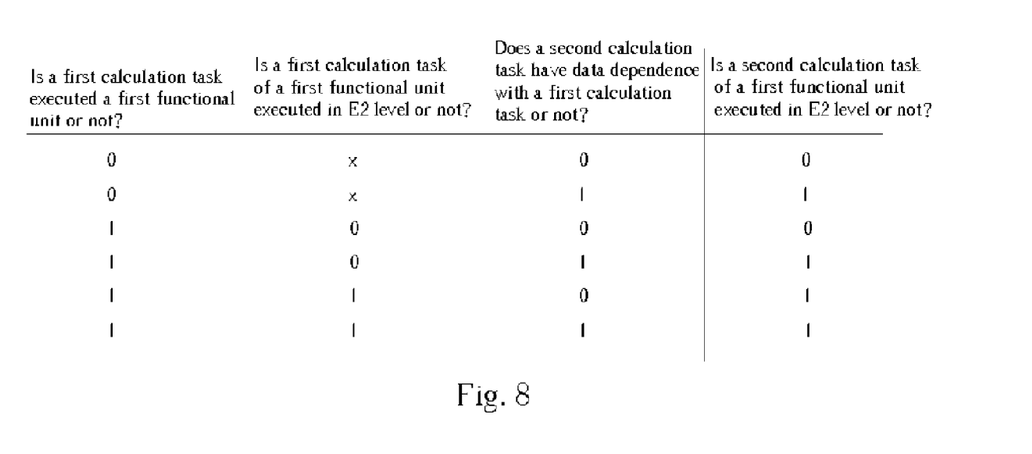
FIG. 8 is a truth table of the best embodiment of the present invention.

Lastly, consider a condition where the first functional unit 12 executes the first calculation task in the second time period and also executes the second calculation task. The first functional unit 12 is controlled by the control unit 16 to execute the second calculation task in the third time period. The above-mentioned method can be described in FIG. 8. FIG. 8 is a truth table of the best embodiment of the present invention wherein a logic value "0" in a column means no, a logic value "1" in a column means yes, and "x" means irrelative.

Next, different calculation processes are described about how to reach a best calculation efficiency of the best embodiment of the present invention. There are three kinds of calculation methods. The first method is to assume that the first functional unit 12 will execute a real calculation task in the level E1 as the method of static pipeline stage control in the prior art. The second method is to assume that the first functional unit 12 will execute a real calculation task in the level E2 as the method of static pipeline stage control in the prior art. The third method is the method described in the best embodiment. Please note, in the third method the first functional unit 12 initially executes a real calculation in the level E1 and executes a corresponding switch according to conditions.

First, an example as mentioned above, r5=abs ((r1+r2)*r3). There are three calculation tasks needed in this calculation process. The first calculation task r0=r1+r2 is completed by utilizing the ALU, the second calculation task r4=r0*r3 is completed by utilizing the MAC, and the third calculation task r5=abs (r4) is completed by utilizing the ALU. Under an inference from a timing perspective view of above-mentioned FIGS. 4 and 5, results can come out as: utilizing the first method to execute calculation tasks, a stall of one instruction cycle occurs between the second and the third calculation tasks; utilizing the second method to execute calculation tasks, a stall of one instruction cycle occurs between the first and the second calculation tasks; and utilizing the method of the present invention to execute calculation, no stall occurs.

Moreover, an example of a 4-byte integer array searching a byte integer with (X*X) integer index back from an initial site is described. A site "A" of the byte integer can be described as an equation of $A=4X^2+I$ wherein I is the initial site. There are three calculation tasks needed in this calculation process. The first calculation task B=X*X is completed by utilizing the MAU, the second calculation task C=4B is completely by utilizing the ALU (moving B two bytes in the left), and the third calculation task A=C+I is completed by utilizing ALU. Under an inference from a timing perspective view of above-mentioned FIGS. 4 and 5, results can come out as: utilizing the first method to execute calculation tasks, a stall of one instruction cycle occurs between the first and the second calculation tasks; utilizing the second method to execute calculation tasks, no stall occurs; and utilizing the method of the present invention to execute calculation tasks, no stall occurs.

Finally, an example of e=(a+b)*(c+d) is described. There are three calculation tasks needed in this calculation process. The first calculation task f=a+b is completed by utilizing the ALU, the second calculation task g=c+d is completely by utilizing the ALU, and the third calculation task e=f*g is completed by utilizing the MAU. Under an inference from a timing perspective view of above-mentioned FIGS. 4 and 5, results can come out as: utilizing the first method to execute calculation tasks, no stall occurs; utilizing the second method to execute calculation tasks, a stall of one instruction cycle occurs between the second and the third calculation tasks; and utilizing the method of the present invention to execute calculation tasks, no stall occurs.

In contrast to the method of static pipeline stage control of the prior art, the method of dynamic pipeline stage control of the present invention will calculate a best suitable time period for executing the second calculation task according to conditions such as the type of functional unit used by a previous calculation task, an executing time period of the previous calculation task, and whether a current calculation task needs a result from the previous calculation. Then, determining the lowest possibility of a stall improves processing efficiency of pipeline architecture.

Those skilled in the art will readily observe that numerous modification and alternations of the present invention method may be made while retaining the teachings of the invention. Accordingly, the above disclosure should be construed as limited only by the metes and bounds of the appended claims.

What is claimed is:

1. A method for improving processing efficiency of pipeline architecture with a processor, the processor having:
   a first functional unit for executing a calculation task;
   a second functional unit for executing another calculation task; and
   a control unit electrically connected to the first and the second functional units for generating a plurality of control signals to control the first and the second functional units;
   the method comprising:
   (a) executing a first calculation task with the first functional unit or the second functional unit;
   (b) determining an executing time period of a second calculation task with the control unit according to the functional unit executing the first calculation task, an executing time period of the first calculation task, and whether the second calculation task depends upon a result of the first calculation task; and
   (c) executing the second calculation task with the first functional unit according to the executing time period of the second calculation task determined in step (b);
   wherein when a calculation task executed by the second functional unit requires more instruction cycles than that of the first functional unit, the control signals control the first and the second functional units to execute the first calculation task within a first time period and a second time period, and to execute the second calculation task within the second time period and a third time period sequentially, the method further comprises:
   when the first calculation task is executed by the second functional unit within the first and the second time period and the second calculation task is executed by the first functional unit, if the second calculation task does not depend upon the result of the first calculation task, executing the second calculation task with the first functional unit within the second time period, if the second calculation task depends upon the result of the first calculation task, executing the second calculation task with the first functional unit within the third time period;
   when the first calculation task is executed by the first functional unit within the first time period and the second calculation task is also executed by the first functional unit, if the second calculation task does not depend upon the result of the first calculation task, executing the second calculation task with the first functional unit within the second time period, if the second calculation task depends upon the result of the first calculation task, executing the second calculation task with the first functional unit within the third time period; and
   when the first calculation task is executed by the first functional unit within the second time period and the second calculation task is also executed by the first functional unit, executing the second calculation task with the first functional unit within the third time period.

2. The method of claim 1 wherein lengths of the first, the second, and the third time periods are all equal to one instruction cycle.

3. The method of claim 1 wherein the first, the second, and the third time periods are non-overlapping with one another.

4. The method of claim 1 wherein the second time period is later than the first time period and the third time period is later than the second time period.

5. A method for improving processing efficiency of pipeline architecture with a processor, the processor having:
   a first functional unit for executing a calculation task requiring a calculating time of one instruction cycle;
   a second functional unit for executing a calculation task requiring a calculating time of two instruction cycle; and
   a control unit electrically connected to the first and the second functional units for generating a plurality of control signals to control the first and the second functional units, so as to execute a first calculation task within a first time period and a second time period, and to execute a second calculation task within the second time period and a third time period sequentially, lengths of the first, the second, and the third time periods being all equal to one instruction cycle, the first, the second, and the third time periods being non-overlapping with one another, the second time period being later than the first time period and the third time period being later than the second time period;
   the method comprising:
   when the first calculation task is executed by the second functional unit within the first and the second time period and the second calculation task is executed by the first functional unit, if the second calculation task does not depend upon the result of the first calculation task, executing the second calculation task with the first functional unit within the second time period, if the second calculation task depends upon the result of the first calculation task, executing the second calculation task with the first functional unit within the third time period;
   when the first calculation task is executed by the first functional unit within the first time period and the second calculation task is also executed by the first functional unit, if the second calculation task does not depend upon the result of the first calculation task, executing the second calculation task with the first functional unit within the second time period, if the second calculation task depends upon the result of the first calculation task, executing the second calculation task with the first functional unit within the third time period; and
   when the first calculation task is executed by the first functional unit within the second time period and the second calculation task is also executed by the first functional unit, executing the second calculation task with the first functional unit within the third time period.

* * * * *